US009170127B2

United States Patent
Cook et al.

(10) Patent No.: US 9,170,127 B2
(45) Date of Patent: Oct. 27, 2015

(54) AMR/AMI PIT LID ANTENNA BRACKET

(71) Applicants: Jeffrey A. Cook, Dripping Springs, TX (US); Howard Johnson, Whitefish, MT (US)

(72) Inventors: Jeffrey A. Cook, Dripping Springs, TX (US); Howard Johnson, Whitefish, MT (US)

( * ) Notice: Subject to any disclaimer, the term of this patent is extended or adjusted under 35 U.S.C. 154(b) by 0 days.

(21) Appl. No.: 14/530,086

(22) Filed: Oct. 31, 2014

(65) Prior Publication Data

US 2015/0122959 A1    May 7, 2015

Related U.S. Application Data

(60) Provisional application No. 61/898,356, filed on Oct. 31, 2013.

(51) Int. Cl.
| | |
|---|---|
| G08B 23/00 | (2006.01) |
| G01D 4/00 | (2006.01) |
| H01Q 1/22 | (2006.01) |
| H01Q 1/04 | (2006.01) |
| F16M 13/02 | (2006.01) |
| G01F 15/18 | (2006.01) |
| H01Q 1/12 | (2006.01) |

(52) U.S. Cl.
CPC .............. *G01D 4/002* (2013.01); *F16M 13/022* (2013.01); *G01D 4/004* (2013.01); *G01F 15/18* (2013.01); *H01Q 1/04* (2013.01); *H01Q 1/12* (2013.01); *H01Q 1/2233* (2013.01)

(58) Field of Classification Search
CPC ...... G01D 4/002; G01D 4/004; G01F 15/063; G01F 15/18; H01Q 1/12
USPC .......... 248/205.1, 200, 309.1, 354.3, 292.12, 248/274.1; 340/870.02
See application file for complete search history.

(56) References Cited

U.S. PATENT DOCUMENTS

| | | | | |
|---|---|---|---|---|
| 5,825,303 | A * | 10/1998 | Bloss et al. | 340/870.02 |
| 5,877,703 | A * | 3/1999 | Bloss et al. | 340/870.02 |
| 6,218,995 | B1 * | 4/2001 | Higgins et al. | 343/719 |
| 6,300,907 | B1 * | 10/2001 | Lazar et al. | 343/700 MS |
| 6,378,817 | B1 * | 4/2002 | Bublitz et al. | 248/200 |
| 6,954,144 | B1 * | 10/2005 | Kiser et al. | 340/539.26 |
| 7,443,313 | B2 * | 10/2008 | Davis et al. | 340/870.02 |
| 7,446,672 | B2 * | 11/2008 | Johnson et al. | 340/870.02 |
| 8,350,719 | B2 * | 1/2013 | Hockema et al. | 340/870.02 |
| 2002/0089428 | A1 * | 7/2002 | Walden et al. | 340/870.02 |

* cited by examiner

*Primary Examiner* — Todd M Epps
(74) *Attorney, Agent, or Firm* — Craig M. Stainbrook; Stainbrook & Stainbrook, LLP

(57) ABSTRACT

An RF antenna bracket for placement through and under a utility meter pit lid for use in an AMR or AMI system that includes a transmitter bracket cap for placement in a hole disposed in a meter pit lid; a cylindrical threaded neck disposed under and depending downwardly from said cap; a female threaded collar threadably disposed on said threaded neck; first and second elongate parallel slide posts connected to and depending downwardly from said female threaded collar, said first slide post having teeth disposed linearly along the length of an interior side of said first slide post; and an antenna mount slidably affixed to said first and second slide posts, said antenna mount engaging said teeth on said first slide post for vertical adjustment and positioning.

8 Claims, 3 Drawing Sheets

AMR/AMI PIT LID ANTENNA BRACKET

CROSS REFERENCES TO RELATED APPLICATIONS

The present application claims the benefit of U.S. Provisional Patent Application Ser. No. 61/898,356, filed Oct. 31, 2013 (Oct. 31, 2013).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to meter covers for meters mounted in a recessed container, and more specifically to a novel underground utility bracket for suspending an automatic meter reader antenna below the underside of a meter pit lid.

2. Background Discussion

Automatic meter readers (AMRs) and Advanced Metering Infrastructure meters (AMI) are typically used with utility meters, such as electric, water and gas meters, to track the utility use electronically and to communicate an indication of the detected use to some external receiver via, for example, a wireless transmitter/receiver connection, a telephone wire, or some other communication channel. Once the AMR/AMI is installed, the service provider, e.g., the electric, water or gas company, can poll the AMR/AMI from a handheld device or transmit to a remote location and receive an indication of the use measured by the meter using, for example, microwave communication, telecommunication or other communication technology embedded in the AMR/AMI. To connect an AMR/AMI to a conventional utility meter the standard mechanical meter index of the meter is removed and replaced with components of the AMR/AMI. (For most water and gas lines, the meter box is subterranean so as to prevent freezing.) After replacement, the mechanical meter index is reinstalled over the AMR/AMI, and the original cover is discarded and replaced with a larger cover that secures both the AMR/AMI and the mechanical meter index to the meter. Installation of an AMR/AMI on most subterranean meters is difficult because these meters must be partially disassembled to connect the AMR/AMI thereto. Traditionally, utility covers were constructed from cast iron, steel, or polymer-concrete formulations, or, less frequently, brass and bronze. While some materials listed are radio transparent, others are less conducive to allowing transmission of radio signals. Cast iron, steel, brass and bronze covers tend to be heavy, and may require the creation of an orifice in the cover to accommodate the efficient transmission of a radio signal. Additionally, brass and bronze will corrode over time at the hinge or at the locking mechanism. Other covers have been developed from concrete-polymer blends that avoid the problems of corrosion; however without a reinforcing material the covers can crack. Mere plastic covers degrade under UV exposure and crack under pressure or float away when challenged with flood situations.

Accordingly, recent improvements in materials have provided for the fabrication of meter pit lids from proprietary radio frequency (RF) transparent polypropylene copolymers that protect the AMR/AMI system from vandalism, electrostatic charges, adverse weather, and so forth, while further providing durability, UV resistance, and corrosion resistance.

The AMR/AMI systems significantly reduce the expense of reading meters manually. But use of RF (electronic) transmitters for the systems require the installation of (at least) a transmitting antenna so that meter readings can be sent either to utility service person conducting street side polling operations or through receivers connected to the cellular phone networks for relay through the network to a central location. However, such transmitters are not without problems because they are generally located below the surrounding ground surface in a covered pit, and signal transmission through the meter pit lid can be compromised. A suitable solution for use in connection with a meter pit lid fabricated from RF transparent material is to provide means to fine tune the transmitting antenna within the meter pit so as to optimize transmission signal quality. The present invention provides such means.

BRIEF SUMMARY OF THE INVENTION

The present invention is an improved RF antenna bracket designed for placement through and under a utility meter pit lid for use in an AMR or AMI system. The bracket is fabricated from an RF transparent polypropylene copolymer that provides an American Association of State Highway and Transportation Officials ("AASHTO") H20 traffic rating that will withstand moving traffic and is also engineered to withstand a 30% impact factor on the traffic loads.

It is therefore an object of the present invention to provide a new and improved antenna bracket for a utility meter cover manufactured of a RF transparent polyolefin or polypropylene copolymer.

It is another object of the present invention to provide a new and improved RF antenna bracket for a utility meter cover preferably disposed in the approximate geometric center of the cover, but capable of placement anywhere within the circumference of the lid.

A further object or feature of the present invention is a new and improved RF antenna bracket for a utility meter cover that achieves an H20 AASHTO rating.

An even further object of the present invention is to provide a novel RF antenna bracket that adjusts to any thickness of meter cover without the need for any tools.

A still further object of the present invention is to provide a novel RF antenna bracket having an interchangeable "snap-in" antenna slide and capture element that will accommodate a wide variety of different AMR/AMI antenna systems.

Yet another object of the present invention is to provide a novel RF antenna bracket that ensures that the antenna mast will always extend slightly above the plane of the immediately surrounding lid surface, thereby dramatically improving RF performance.

The RF antenna bracket of the present invention is preferably constructed of several selected materials for improved RF performance, load rating, chemical resistance, and operation within a broad temperature range. This can be accomplished using a polypropylene co-polymer, though other materials may be specified to allow transmission of RF signal from a transmitting meter to an AMR/AMI, while also achieving sufficient weather resistance and strength, and thereby maintaining its H20 rating under considerable loads under a temperature range of −40° F. and 180° F.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
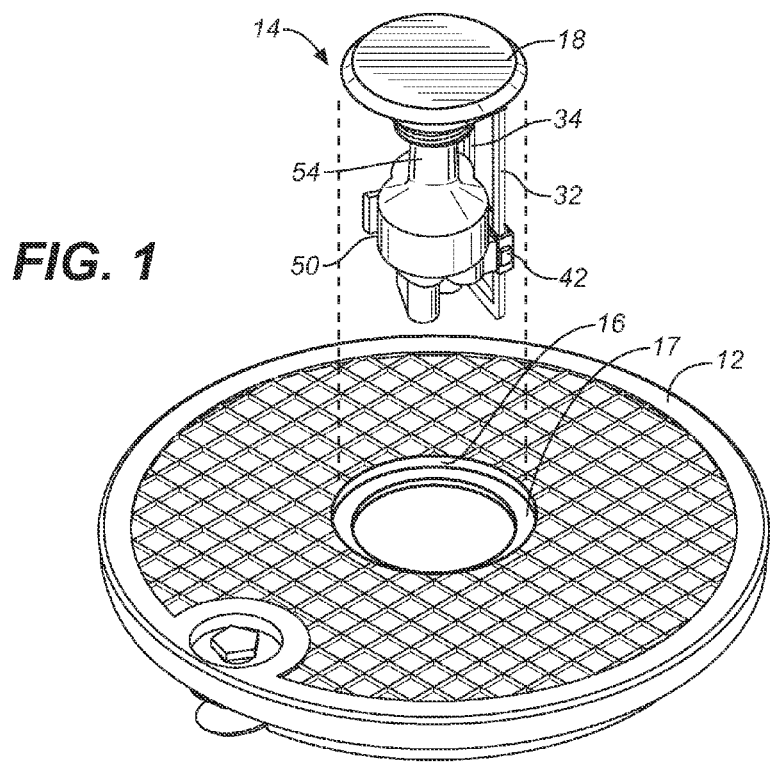
FIG. 1 is an upper perspective view of a first preferred embodiment of the RF transparent AMR/AMI antenna bracket, showing the invention both installed and disposed over a utility pit cover.
Figures 2, 3:
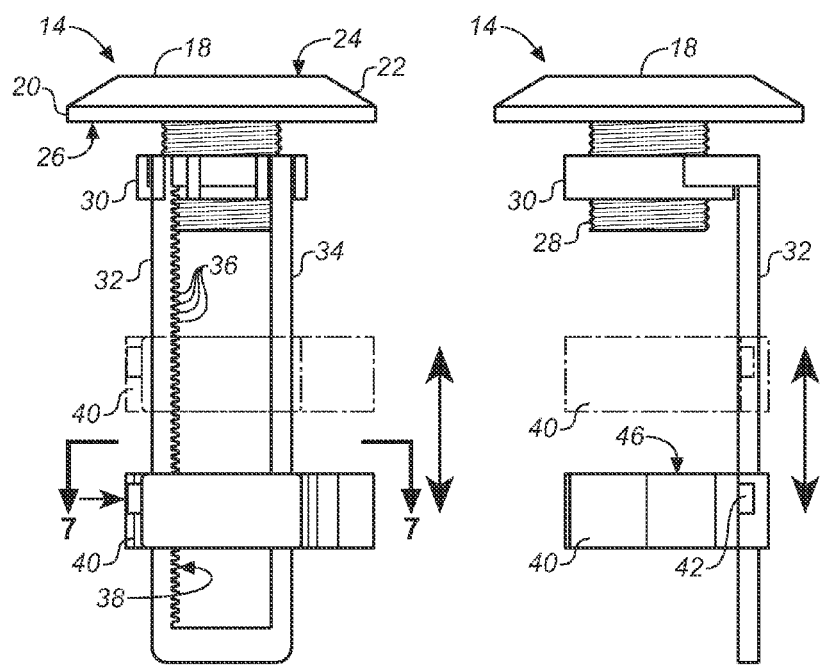
FIG. 2 is a schematic front view in elevation thereof.
FIG. 3 is a schematic side view in elevation thereof.
Figure 4:
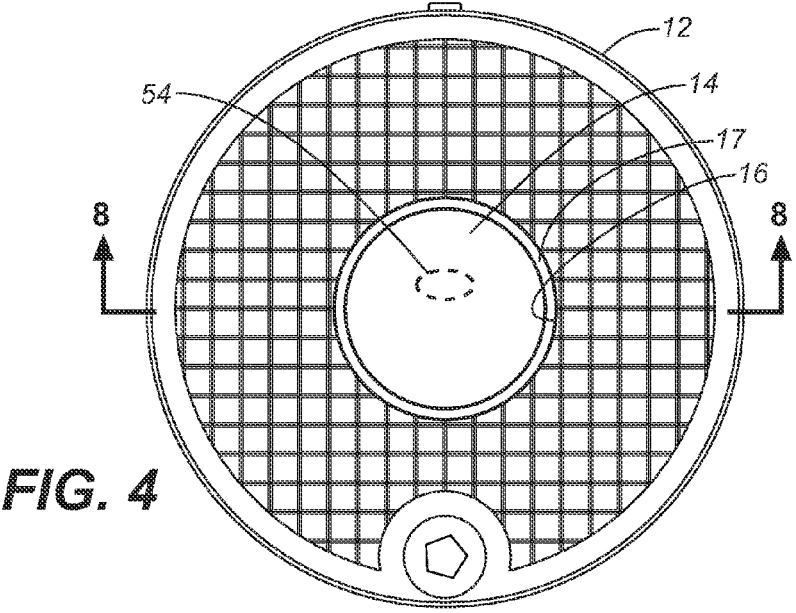
FIG. 4 is an upper perspective view showing the antenna bracket installed in a meter pit lid.
Figures 5, 6:
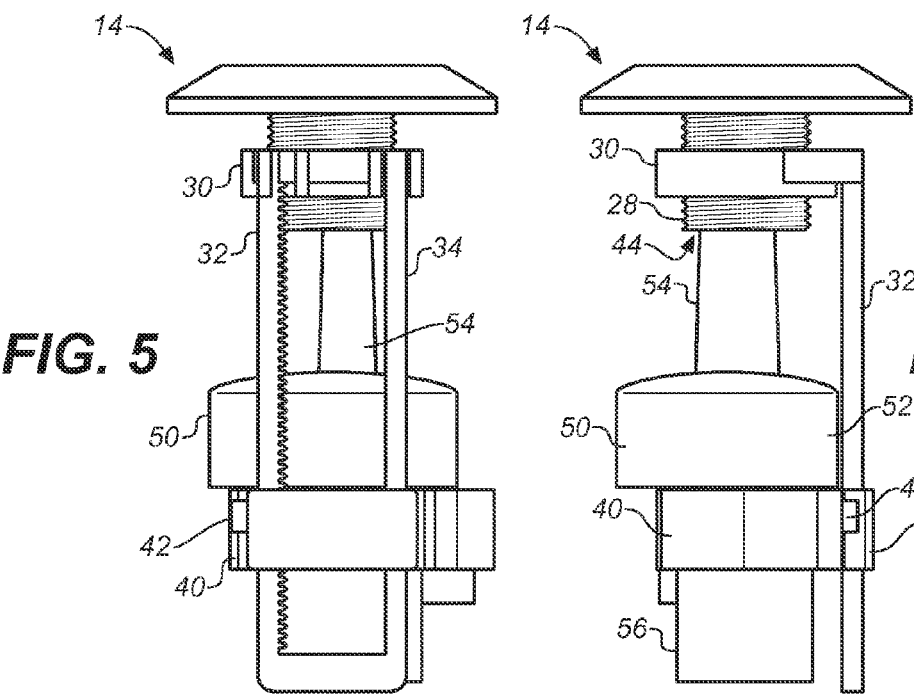
FIG. 5 is a schematic front view in elevation showing the bracket with a transmitting antenna mounted.
FIG. 6 is a side view in elevation thereof.
Figure 7:
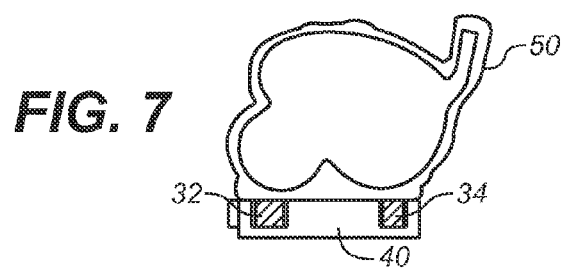
FIG. 7 is a cross-sectional top plan view take through section lines 7-7 of FIG. 2.
Figure 8:
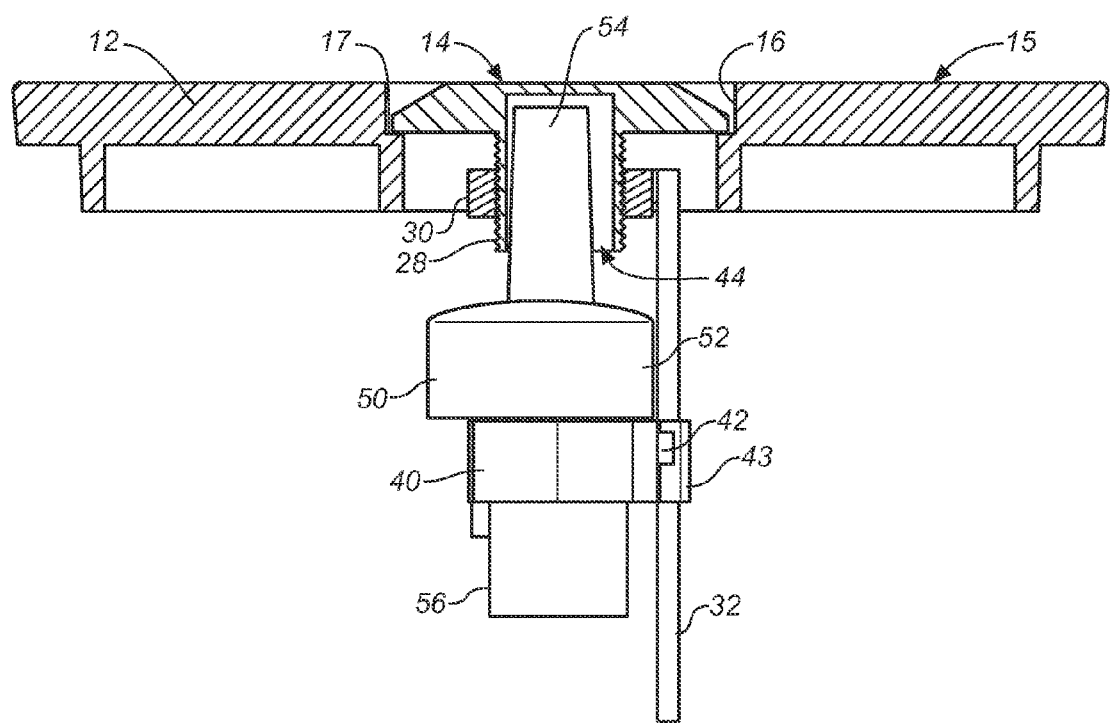
FIG. 8 is a cross sectional side view in elevation showing the antenna mast of the mounted antenna extending up into the threaded neck of the cap so as to have at least an uppermost portion above the level of the pit lid surface.

Referring to FIGS. 1 through 8, wherein like reference numerals refer to like components in the various views, there is illustrated therein a new and improved AMR/AMI antenna for installation through and under an RF transparent utility cover or meter box lid, generally denominated 10 herein.

FIG. 1 shows an exploded view of a utility meter box lid 12 with a transmitter bracket cap 14 disposed through its center hole 16. The cap 14 includes a head 18 having a circular flange or disk 20 with a beveled edge 22 and generally planar top side 24. The flange also has a generally planar underside 26. A threaded neck 28 depends downwardly from the cap head and is inserted through the center hole 16 of the pit lid 12.

The bracket assembly next includes a female threaded collar 30 with first and second parallel slide posts 32, 34, on the first of which are gear teeth 36 disposed linearly along the length of the interior side 38 of the slide post. An antenna capture element and mount 40 slides while being affixed to both slide posts and includes a spring-biased push button slide element 42 that selectively permits vertical movement of the antenna mount up and down the slide posts, in a manner well known in the art. The slide element and antenna capture element and mount can be removed from posts 32, 34 simply by removing retaining plate 43, which is screwed onto the push button slide element so as to capture the posts and put the slide element into operative engagement with the gear teeth 36 on post 32.

FIGS. 5-8 show an exemplary use of the system showing a transceiver 50 mounted on the antenna mount. The transceiver design includes an electronics housing 52 mounted atop the antenna mount, an antenna mast housing 54 that extends upwardly into the cylindrical opening 44 of threaded neck 28, as well as a battery compartment 56 that extends downwardly through the opening 46 in the antenna capture element and mount 40. The antenna capture element and mount opening 46 can be (and preferably is) tailored to the shape of the particular antenna system to be mounted, which, in the example shown, is configured to accommodate the transceiver system. As noted, plate 43 can be removed from slide 42 so as to enable swapping out antenna models.

Installation of the antenna bracket assembly involves little more than removing the center plug of an existing pit lid or drilling a suitably sized hole, inserting the threaded neck 28 through the hole 16, threadably attaching collar 30 and screwing it up until it engages the underside of the meter pit lid 12, thereby sandwiching the pit lid between the collar and the underside of the cap head and thus securing the bracket assembly. The transceiver system 50 is then mounted onto antenna capture element and mount 40 and is then vertically adjusted along slide posts 34, 34 so as to insert and bring the antenna mast housing into the cylindrical opening 46 of threaded neck 28 wherein the sliding element is employed to adjust the position of the mast until the uppermost or top of the mast housing 54 is nearly co-planar with the surface 15 of the meter box lid and above the recessed surface (or ledge) 17 of the hole 16, thereby exposing the antenna to outside atmosphere only through RF transparent cap 14, and thus enhancing RF signal reception and transmission.

From the foregoing, it will be seen that in its most essential aspect, the RF antenna bracket and mounting system of the present invention comprises a transmitter bracket cap for placement in a hole disposed in a meter pit lid; a cylindrical threaded neck disposed under and depending downwardly from the cap; a female threaded collar threadably disposed on the threaded neck; first and second elongate parallel slide posts connected to and depending downwardly from the female threaded collar, the first slide post having teeth disposed linearly along the length of an interior side of the first slide post; and an antenna mount slidably affixed to the first and second slide posts, the antenna mount engaging the teeth on the first slide post for vertical adjustment and positioning.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the claims set forth herein.

What is claimed as invention is:

1. An RF antenna bracket for placement through and under a utility meter pit lid for use in an AMR or AMI system, comprising:

a transmitter bracket cap for placement in a hole disposed in a meter pit lid;

a cylindrical threaded neck disposed under and depending downwardly from said cap;

a female threaded collar threadably disposed on said threaded neck;

first and second elongate parallel slide posts connected to and depending downwardly from said female threaded collar, said first slide post having teeth disposed linearly along a length of an interior side of said first slide post; and an antenna mount slidably affixed to said first and second slide posts, said antenna mount engaging said teeth on said first slide post for vertical adjustment and positioning.

2. The RF antenna bracket of claim 1, wherein said antenna mount is vertically adjustable along said first and second slide posts.

3. The RF antenna bracket of claim 2, wherein said antenna mount includes a spring-biased push button slide element that selectively permits vertical movement of the antenna mount up and down said first and second slide posts.

4. The RF antenna bracket of claim 3, wherein said cap includes a head having a circular flange or disk with a beveled edge and generally planar top side, and wherein said flange has a generally planar underside.

5. The RF antenna bracket of claim 1, wherein said cylindrical threaded neck and said female threaded collar enable said RF antenna bracket to adjust to a variety of meter cover thicknesses without a need for any adjustment tools.

6. The RF antenna bracket of claim 1, further including an interchangeable snap-in antenna mount that accommodates different AMR/AMI antenna systems.

7. The RF antenna bracket of claim 1, wherein said RF antenna bracket includes an antenna mast that extends above a plane of an immediately surrounding meter pit lid surface.

8. The RF antenna bracket of claim 1, wherein said bracket is fabricated from either an RF transparent polypropylene or polyolefin copolymer and meets an American Association of State Highway and Transportation Officials H20 traffic rating to withstand moving traffic.

* * * * *